US012791930B2

(12) United States Patent
Chien et al.

(10) Patent No.: US 12,791,930 B2
(45) Date of Patent: Nov. 10, 2026

(54) LASER PROJECTION APPARATUS

(71) Applicant: QISDA CORPORATION, Taoyuan City (TW)

(72) Inventors: Chih-Shiung Chien, Taoyuan City (TW); Ming-Kuen Lin, Taoyuan City (TW); Tsung-Hsun Wu, Taoyuan City (TW)

(73) Assignee: QISDA CORPORATION, Taoyuan City (TW)

( * ) Notice: Subject to any disclaimer, the term of this patent is extended or adjusted under 35 U.S.C. 154(b) by 324 days.

(21) Appl. No.: 18/608,904

(22) Filed: Mar. 18, 2024

(65) Prior Publication Data

US 2024/0361680 A1 Oct. 31, 2024

(30) Foreign Application Priority Data

Apr. 27, 2023 (TW) ................................ 112115712

(51) Int. Cl.
*G03B 21/20* (2006.01)
*G03B 21/00* (2006.01)

(52) U.S. Cl.
CPC ......... *G03B 21/208* (2013.01); *G03B 21/008* (2013.01); *G03B 21/2013* (2013.01); *G03B 21/2033* (2013.01); *G03B 21/2066* (2013.01)

(58) Field of Classification Search
CPC .............. G03B 21/208; G03B 21/2013; G03B 21/2033; G03B 21/2066
See application file for complete search history.

(56) References Cited

U.S. PATENT DOCUMENTS

2019/0391476 A1* 12/2019 Akiyama ............. H04N 9/3158

* cited by examiner

*Primary Examiner* — Jerry L Brooks
(74) *Attorney, Agent, or Firm* — Winston Hsu

(57) ABSTRACT

A laser projection apparatus includes a reflecting unit, a reflecting diffuser, a first lens array having a length and a width, a condensing lens having first and second lens portions and first and second center axes, a laser set emitting a first color light, an imaging module, and a projection lens. The reflecting unit reflects the first color light to the first lens portion. The reflecting diffuser reflects the first color light to travel along a light-exit axis of the second lens portion. The first lens array is disposed on the light-exit axis. The length along the first center axis and the width along the second center axis are less than or equal to one half of a diameter of the condensing lens and the diameter, respectively. The imaging module is disposed on the light-exit axis. The imaging module and the projection lens receive the first color light sequentially.

16 Claims, 8 Drawing Sheets

LASER PROJECTION APPARATUS

BACKGROUND OF THE INVENTION

1. Field of the Invention

The present invention relates to a laser projection apparatus, and more specifically, to a laser projection apparatus reducing a length of a lens array to be less than or equal to one half of a diameter of the condensing lens and reducing a width of the lens array to be less than or equal to the diameter of the condensing lens.

2. Description of the Prior Art

In general, a conventional laser projection apparatus adopts a light mixing module to provide a multicolor laser beam for subsequent image projection. In current application, for reducing an overall volume of a laser source of the laser projection apparatus, a common design involves packaging red, green, and blue laser diodes in a side-by-side arrangement into one multicolor laser source module, so as to simultaneously provide red, green and blue color lights to the light mixing module of the laser projection apparatus. In practical application, for further reducing the overall volume of the laser projection apparatus, the prior art usually adopts a lens reducing design. However, as shown in FIG. 1, since a laser spot 1 emitted from the light mixing module of the laser projection apparatus is symmetrically circular on both X and Y axes, directly reducing a diameter size of a projection lens 2 would significantly decrease the light usage efficiency of the laser projection apparatus. Accordingly, the aforesaid lens reducing design greatly affects the projection brightness and quality of the laser projection apparatus.

SUMMARY OF THE INVENTION

The present invention provides a laser projection apparatus including a laser set, a condensing lens, a reflecting unit, a reflecting diffuser, a first lens array, an imaging module, and a projection lens. The laser set includes a plurality of first lighting units arranged in sequence. The plurality of first lighting units emits a first color light. The condensing lens has a first lens portion and a second lens portion. The reflecting unit is obliquely disposed on a light-entrance axis of the first lens portion and opposite to the plurality of first lighting units for reflecting the first color light to be incident to the first lens portion along the light-entrance axis. The reflecting diffuser is disposed at a side of the condensing lens, for receiving the first color light transmitted from the first lens portion and reflecting the first color light to the second lens portion, to make the first color light travel along a light-exit axis of the second lens portion. A first center axis of the condensing lens is perpendicular to the light-entrance axis and the light-exit axis respectively, and a second center axis of the condensing lens is perpendicular to the first center axis. The first lens array is disposed on the light-exit axis, for receiving the first color light transmitted from the second lens portion. A length of the first lens array along the first center axis is less than or equal to one half of a diameter of the condensing lens, and a width of the first lens array along the second center axis is less than or equal to the diameter of the condensing lens. The imaging module is disposed on the light-exit axis, for receiving the first color light transmitted from the first lens array to form a projection beam. The projection lens receives the projection beam transmitted from the imaging module for optical projection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
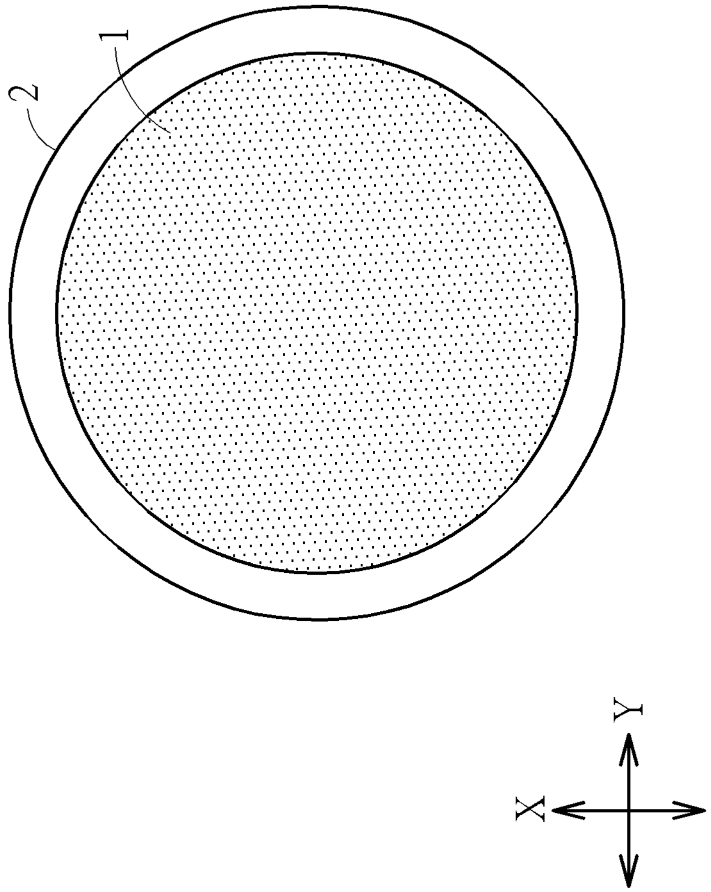
FIG. 1 PRIOR ART
FIG. 1 is a diagram of a projection lens and a laser spot according to the prior art.
Figure 2:
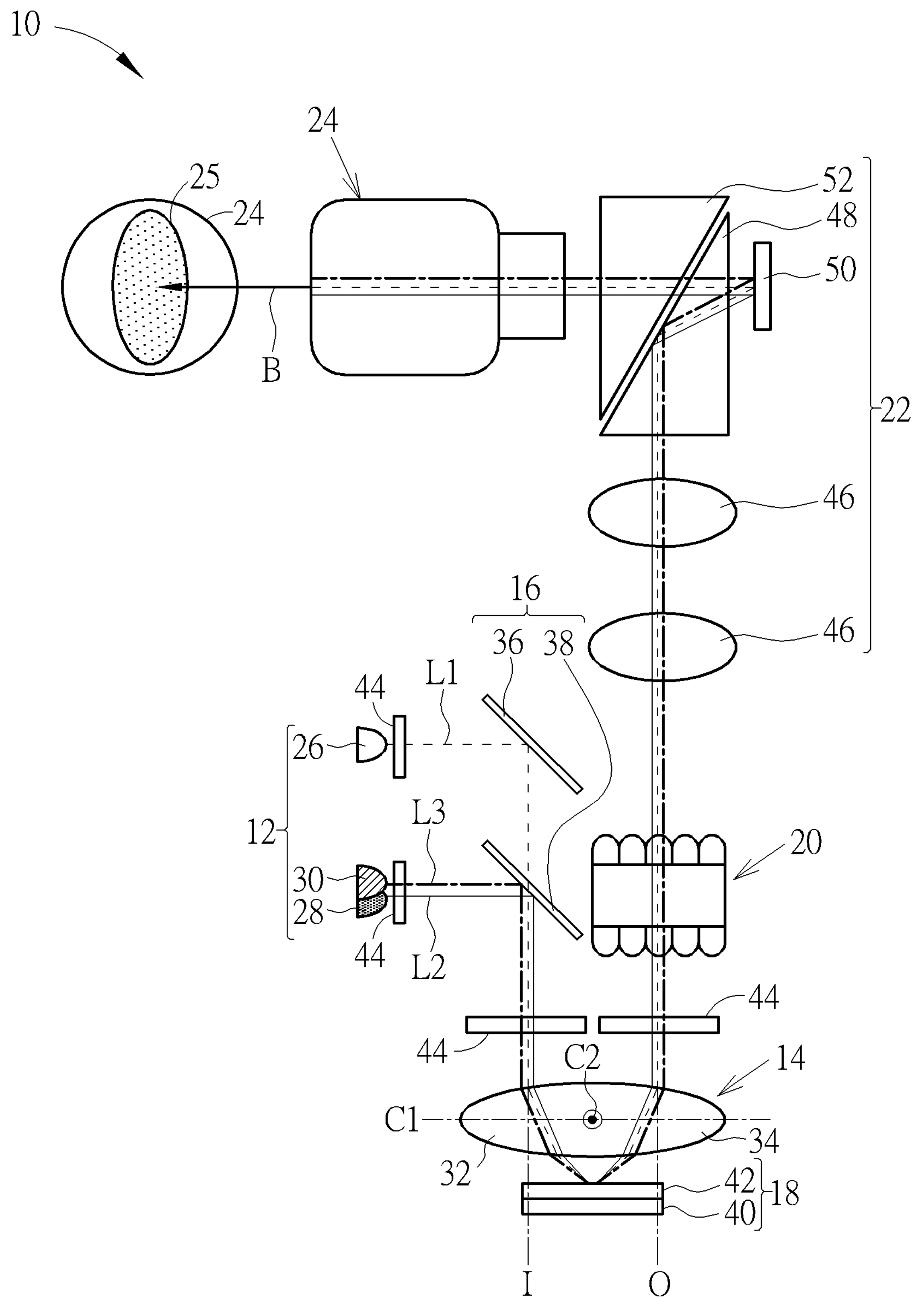
FIG. 2 is a side view of a laser projection apparatus according to an embodiment of the present invention.

Please refer to FIG. 2, which is a side view of a laser projection apparatus 10 according to an embodiment of the present invention. As shown in FIG. 2, the laser projection apparatus 10 is used for laser projection imaging. The laser projection apparatus 10 includes a laser set 12, a condensing lens 14, a reflecting unit 16, a reflecting diffuser 18, a first lens array 20, an imaging module 22, and a projection lens 24.

The laser set 12 includes a plurality of first lighting units 26 arranged in sequence and a plurality of second lighting units 28 and a plurality of third lighting units 30 arranged in sequence and adjacent to the first lighting units 26. In FIG. 2, only one first lighting unit 26, only one second lighting unit 28, and only one third lighting unit 30 are shown for simplicity, and the actual number and arrangement of lighting units depend on the practical application of the laser projection apparatus 10 (e.g., arranging four first lighting units 26 in a row and arranging two third lighting units 30 and three second lighting units 28 in another row, but not limited thereto). In this embodiment, the first lighting unit 26 is preferably a red laser diode emitting red light as a first color light L1, the second lighting unit 28 is preferably a blue laser diode emitting blue light as a second color light L2, and the third lighting unit 30 is preferably a green laser diode emitting green light as a third color light L3. The present invention is not limited to the aforesaid design, meaning that the type of light source could be varied with the practical application of the laser projection apparatus 10.

The condensing lens 14 could be preferably a collimator lens (but not limited thereto) and has a first lens portion 32 and a second lens portion 34 for collimating and condensing the first color light L1, the second color light L2, and the third color light L3. Furthermore, in this embodiment, the reflecting unit 16 could include a reflective sheet 36 and a dichroic sheet 38. The reflective sheet 36 is obliquely disposed on a light-entrance axis I (preferably, an oblique angle of the reflective sheet 36 relative to the light-entrance axis I is equal to 45°, but not limited thereto) of the first lens portion 32 and opposite to the plurality of first lighting units 26, so as to reflect the first color light L1 to travel along the light-entrance axis I. The dichroic sheet 38 is obliquely disposed on the light-entrance axis I (preferably, an oblique angle of the dichroic sheet 38 relative to the light-entrance axis I is equal to 45°, but not limited thereto) and opposite to the second lighting unit 28 and the third lighting unit 30, for reflecting the second color light L2 and the third color light L3 to travel along the light-entrance axis I and making the first color light L1 to pass therethrough, such that the first color light L1, the second color light L2, and the third color light L3 are mixed along the light-entrance axis I and then pass through the first lens portion 32 for generating the effect that the mixed laser beam can be incident to the reflecting diffuser 18.

As shown in FIG. 2, the reflecting diffuser 18 is disposed at a side of the collimator lens 14 for diffusing and homogenizing the energy and directivity of the first color light L1, the second color light L2, and the third color light L3 and reflecting the first color light L1, the second color light L2, and the third color light L3 to the second lens portion 34, so as to guide the first color light L1, the second color light L2, and the third color light L3 to travel along a light-exit axis O of the second lens portion 34. To be more specific, in this embodiment, the reflecting diffuser 18 could include a reflective sheet 40 and a haze diffusion layer 42. The haze diffusion layer 42 could be formed on the reflective sheet 40 by machining (e.g., metal bumps), or could be attached or coated on the reflective sheet 40, to make the first color light L1, the second color light L2, and the third color light L3 pass through the second lens portion 34 after homogenization and reflection of the reflecting diffuser 18. The reflective sheet 40 could be preferably a metal plate or a reflective mirror, and a haze of the haze diffusion layer 42 could be preferably greater than 1.5 (but not limited thereto). In addition, the present invention could adopt the design in which the reflecting diffuser is movably disposed at a side of the collimator lens for further enhancing the diffusing and reflecting effects of the reflecting diffuser and prevent overheating of the reflecting diffuser. For example, the reflecting diffuser 18 as shown in FIG. 2 could move reciprocally relative to the condensing lens 14 (e.g., moving leftward and rightward along a horizontal direction in FIG. 2, but not limited thereto). In another embodiment, the reflecting diffuser 18 could be a diffusing wheel to rotate relative to the condensing lens 14.

In practical application, the laser projection apparatus 10 could be equipped with a diffusion sheet for further diffusing and homogenizing the energy and directivity of the first color light L1, the second color light L2, and the third color light L3. For example, the laser projection apparatus 10 could include at least one diffusion sheet 44 (preferably rotating or moving back and forth relative to the collimator lens 14, but not limited thereto). As shown in FIG. 2, there could be four diffusion sheets 44 disposed between the first lighting unit 26 and the reflective sheet 36, between the second and third lighting units 28 and 30 and the dichroic sheet 38, between the reflecting unit 16 and the first lens portion 32, and between the second lens portion 34 and the first lens array 20, respectively. However, the present invention is not limited thereto, which means that the number and arrangement of diffusion sheets could be varied with the practical application of the laser projection apparatus 10.

Figure 3:
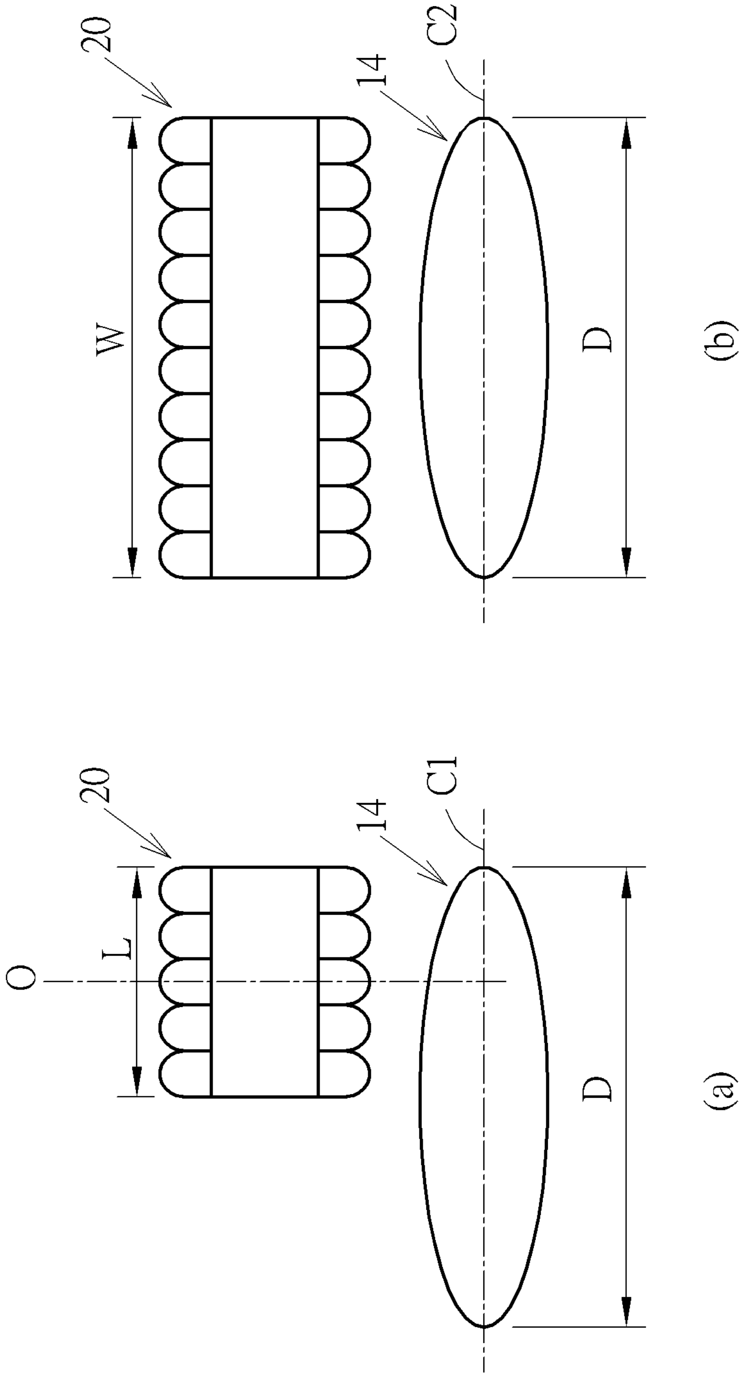
FIG. 3 is a diagram showing a size ratio between a first lens array and a condensing lens in FIG. 2.
Figure 4:
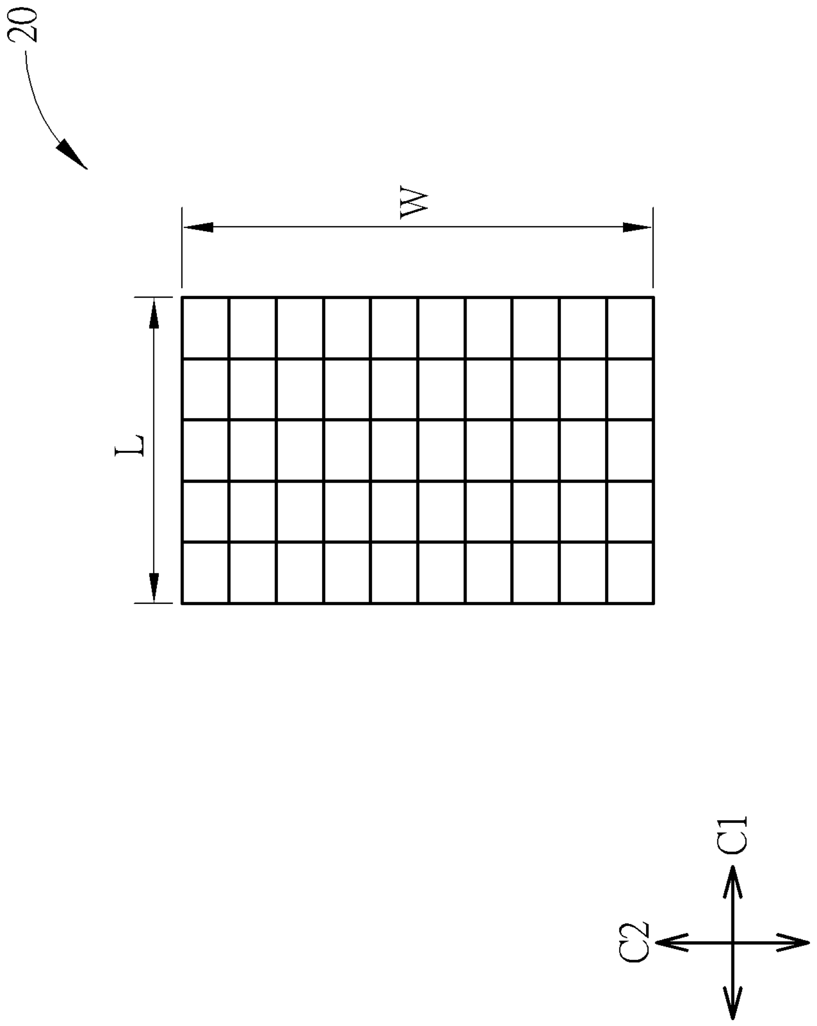
FIG. 4 is a front view of the first lens array in FIG. 2.

Please refer to FIG. 2, FIG. 3, and FIG. 4 for the design of the first lens array 20. FIG. 3 is a diagram showing a size ratio between the first lens array 20 and the condensing lens 14 in FIG. 2. FIG. 4 is a front view of the first lens array 20 in FIG. 2. As shown in FIG. 2, FIG. 3 and FIG. 4, the first lens array 20 could be disposed corresponding to the second lens portion 34 for receiving the first color light L1, second color light L2, and third color light L3 transmitted from the second lens portion 34 along the light-exit axis O, so as to generate the light splitting, beam shaping, and speckle mixing effects. To be more specific, in this embodiment, a length L of the first lens array 20 along a first center axis C1 of the condensing lens 14 could be preferably equal to one half of a diameter D of the condensing lens 14 (as shown in FIG. 3(*a*), but not limited thereto, meaning that the present invention could adopt the design that the length L is less than one half of the diameter D of the condensing lens 14). Furthermore, a width W of the first lens array 20 along a second center axis C2 of the condensing lens 14 could be preferably equal to the diameter D of the condensing lens 14 (as shown in FIG. 3(*b*), but not limited thereto, meaning that the present invention could adopt the design that the width W is less than the diameter D of the condensing lens 14). In other words, an aspect ratio of the first lens array 20 could be preferably equal to 0.5. The first center axis C1 of the condensing lens 14 could preferably intersect perpendicularly with the light-entrance axis I and the light-exit axis O as shown in FIG. 2, and the second center axis C2 of the condensing lens 14 could be perpendicular to the first center axis C1. However, in another embodiment, the first center axis C1 could be perpendicular to the light-entrance axis I and the light-exit axis O without intersecting with the light-entrance axis I and the light-exit axis O, which means the first lens array 20 could be obliquely placed relative to the condensing lens 14.

Furthermore, as shown in FIG. 2, the imaging module 22 is positioned on the light-exit axis O to receive the first color light L1, second color light L2, and third color light L3 transmitted from the first lens array 20 for forming a projection beam B, and the projection lens 24 receives the projection beam B transmitted from the imaging module 22 for subsequent optical projection. To be more specific, in this embodiment, the imaging module 22 could include at least one relay lens 46 (two shown in FIG. 2, but not limited thereto), a first rectangular prism 48, an imaging component 50, and a second rectangular prism 52. The relay lens 46 is disposed on the light-exit axis O to magnify and transmit the first color light L1, second color light L2, and third color light L3 transmitted from the first lens array 20. The first rectangular prism 48 and the second rectangular prism 52 are disposed on the light-exit axis O and opposite to each other. The imaging component 50 could be preferably a digital micromirror device and is located at a side of the first rectangular prism 48. Accordingly, the first rectangular prism 48 reflects the first color light L1, second color light L2, and third color light L3 transmitted from the relay lens 46 to the imaging component 50, and the imaging component 50 then reflects the first color light L1, second color light L2, and third color light L3 to form the projection beam B. In such a manner, the projection beam B can pass through the first rectangular prism 48 and the second rectangular prism 52 sequentially to be incident to the projection lens 24, so as to provide a multicolor laser beam to the laser projection apparatus 10 for subsequent image projection. As shown in FIG. 2, the projection beam B has a laser spot 25 in an elliptical shape within the projection lens 24.

In summary, by reducing the length of the first lens array to be less than or equal to one half of the diameter of the condensing lens and reducing the width of the first lens array to be less than or equal to the diameter of the condensing lens, the present invention can achieve the laser spot reducing effect that the laser spot of the laser beam projected in the projection lens is in an elliptical shape. Compared with the prior art adopting the design that the laser spot is symmetrically circular, the present invention not only minimizes the impact on the light usage efficiency of the laser projection apparatus when reducing the diameter of the projection lens to decrease the overall volume of the laser projection apparatus, but also increases the flexibility in lens size selection for the laser projection apparatus.

Figure 5:
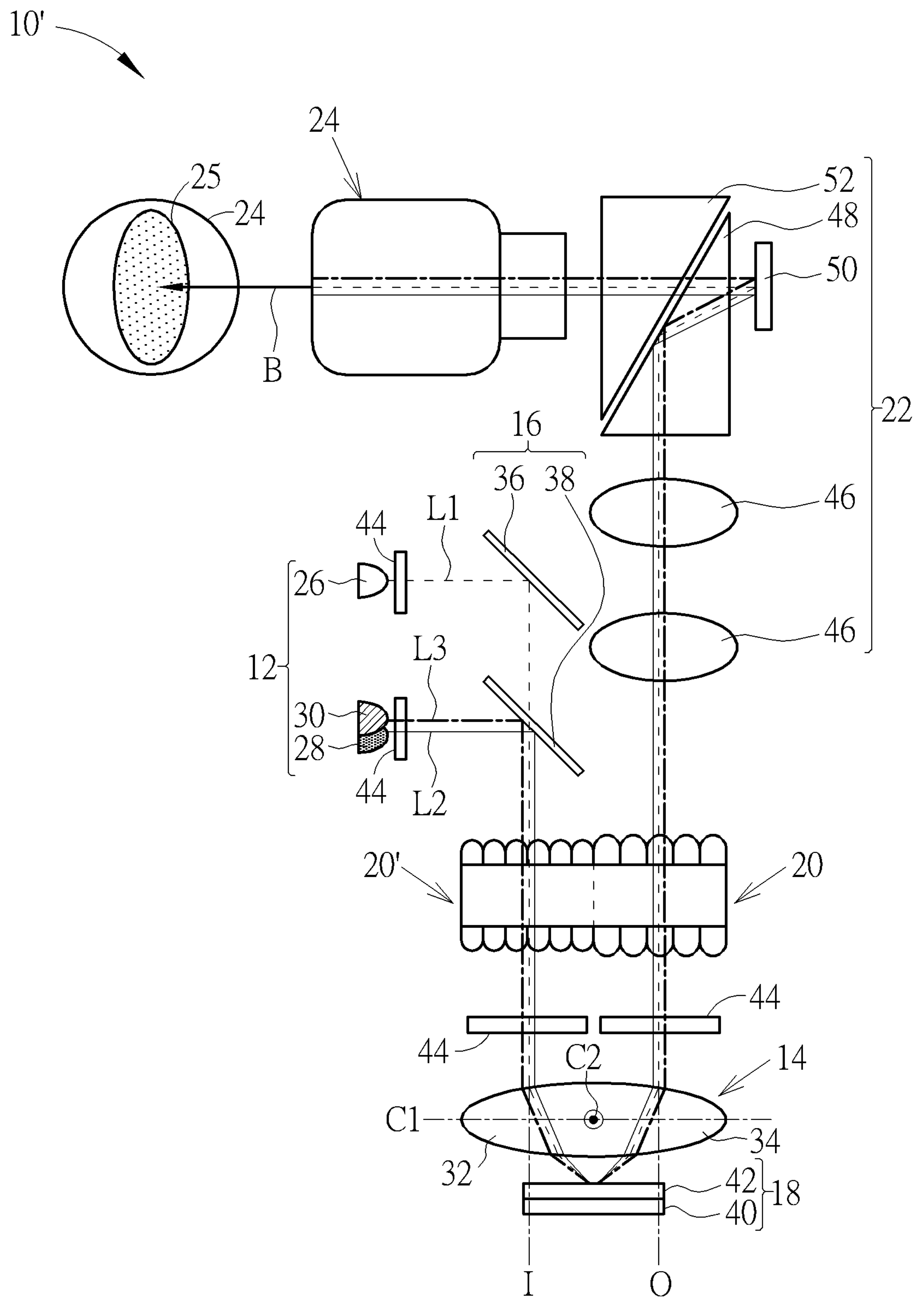
FIG. 5 is a side view of a laser projection apparatus according to another embodiment of the present invention.
Figure 6:
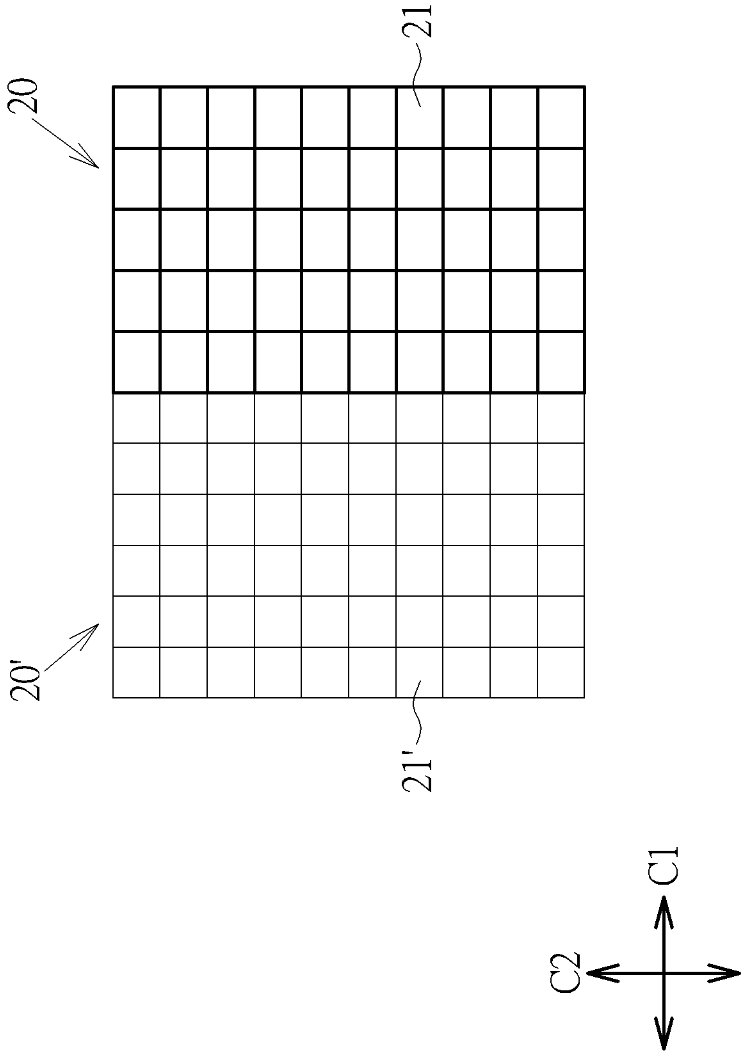
FIG. 6 is a front view of the first lens array and a second lens array in FIG. 5.

It should be mentioned that the lens array configuration adopted by the present invention is not limited to the aforesaid embodiments. For example, please refer to FIG. 5 and FIG. 6. FIG. 5 is a side view of a laser projection apparatus 10' according to another embodiment of the present invention. FIG. 6 is a front view of the first lens array 20 and a second lens array 20' in FIG. 5. Components both mentioned in this embodiment and the aforesaid embodiments represent components with similar structures or functions, and the related description is omitted herein. As shown in FIG. 5 and FIG. 6, the laser projection apparatus 10' includes the laser set 12, the condensing lens 14, the reflecting unit 16, the reflecting diffuser 18, the first lens array 20, the imaging module 22, the projection lens 24, and the second lens array 20'. The second lens array 20' is connected to the first lens array 20 (preferably in an integral molding or structural engagement manner, but not limited thereto, meaning that the second lens array 20' and the first lens array 20 could be disposed separately in another embodiment). The second lens array 20' is disposed on the light-entrance axis I and located between the first lens portion 32 and the reflecting unit 16 to receive the first color light L1, second color light L2, and third color light L3 transmitted along the light-entrance axis I from the reflecting unit 16 for light mixing, thereby generating the light splitting, beam shaping, and speckle mixing effects for improving the light usage efficiency of the laser projection apparatus 10'. In this embodiment, a micro-lens size of the second lens array 20' could be preferably smaller than a micro-lens size of the first lens array 20, and a number of micro-lenses on the second lens array 20' could be preferably greater than a number of micro-lenses on the first lens array 20. For example, as shown in FIG. 6 (but not limited thereto), a size of each micro-lens 21' of the second lens array 20' is smaller than a size of each micro-lens 21 of the second lens array 20, and a number of micro-lenses 21' is greater than a number of micro-lenses 21. As for other related description for the laser projection apparatus 10' (e.g., the design of adding at least one diffusion sheet 44), it could be reasoned by analogy according to the aforesaid embodiments and omitted herein.

Figure 7:
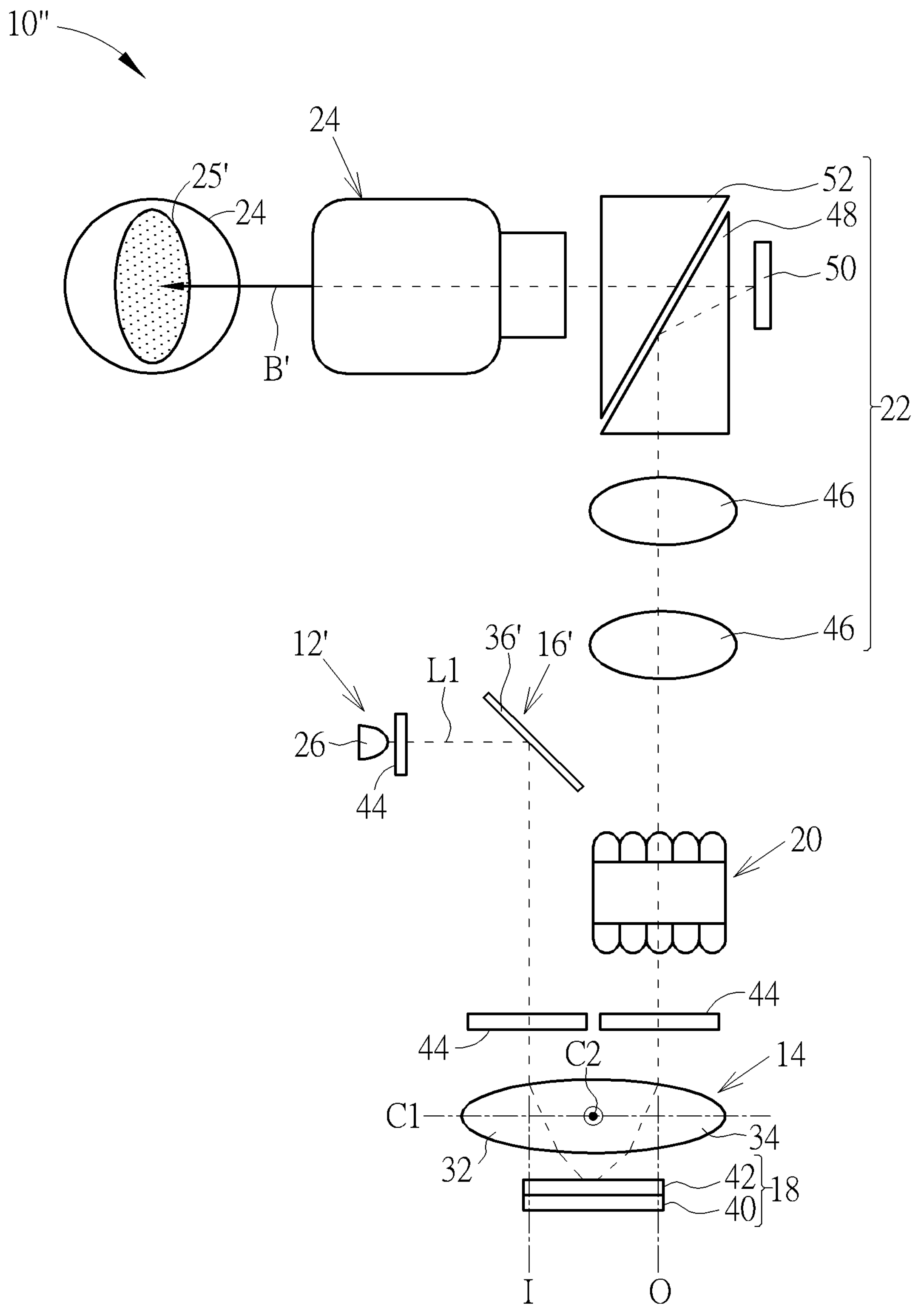
FIG. 7 is a side view of a laser projection apparatus according to another embodiment of the present invention.

Furthermore, the laser configuration adopted by the present invention is not limited to the multi-color light source configuration mentioned in the aforesaid embodiments, meaning that the present invention could adopt a single-color laser configuration in another embodiment. For example, please refer to FIG. 7, which is a side view of a laser projection apparatus 10" according to another embodiment of the present invention. Components both mentioned in this embodiment and the aforesaid embodiments represent components with similar structures or functions, and the related description is omitted herein. As shown in FIG. 7, the laser projection apparatus 10" includes a laser set 12', the condensing lens 14, a reflecting unit 16', the reflecting diffuser 18, the first lens array 20, the imaging module 22, and the projection lens 24. In this embodiment, the laser set 12' could only include the first lighting unit 26 (but not limited thereto, meaning that the type of the lighting unit could be varied with the practical application of the laser projection apparatus 10". The reflecting unit 16' includes a reflective sheet 36'. The reflective sheet 36' is obliquely disposed on the light-entrance axis I to reflect the first color light L1 to the first lens portion 32. As such, via light condensing of the condensing lens 14, light diffusion and homogenization of the reflecting diffuser 18, light mixing of the first lens array 20 and imaging of the imaging module 22, the projection lens 24 can receive a single-color projection beam B' transmitted from the imaging module 22 for subsequent optical projection. As shown in FIG. 7, the projection beam B' can have an elliptical single-color laser spot 25' within the projection lens 24. As for other related description for the laser projection apparatus 10" (e.g., the design of adding at least one diffusion sheet 44), it could be reasoned by analogy according to the aforesaid embodiments and omitted herein.

Figure 8:
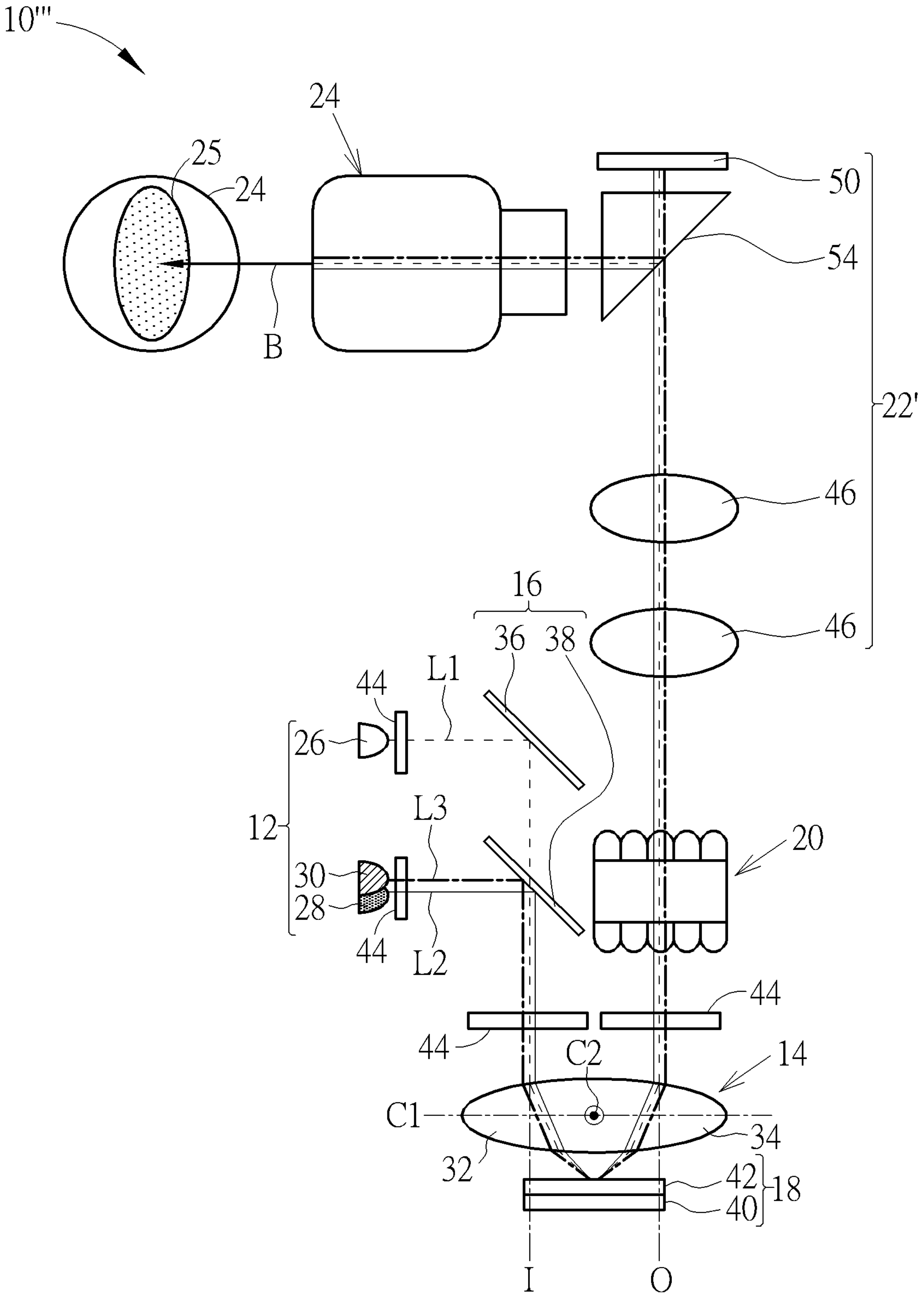
FIG. 8 is a side view of a laser projection apparatus according to another embodiment of the present invention.

Moreover, the prism design adopted by the present invention is not limited to the dual prism design mentioned in the aforesaid embodiments, meaning that the present invention could adopt a single rectangular prism design to achieve the effect of reducing the overall volume of the imaging module to be advantageous to the thinning design of the laser projection apparatus. For example, please refer to FIG. 8, which is a side view of a laser projection apparatus 10'" according to another embodiment of the present invention. Components both mentioned in this embodiment and the aforesaid embodiments represent components with similar structures or functions, and the related description is omitted herein. As shown in FIG. 8, the laser projection apparatus 10'" includes the laser set 12, the condensing lens 14, the reflecting unit 16, the reflecting diffuser 18, the first lens array 20, an imaging module 22', and the projection lens 24. As shown in FIG. 8, in this embodiment, the imaging module 22' includes at least one relay lens 46 (two shown in FIG. 8, but not limited thereto), the imaging component 50, and a rectangular prism 54. The imaging component 50 is disposed on the light-exit axis O, and the rectangular prism 54 is disposed on the light-exit axis O and is located between the relay lens 46 and the imaging component 50. Accordingly, the rectangular prism 54 can make the first color light L1, the second color light L2, and the third color light L3 transmitted from the relay lens 46 to the imaging component 50, and the rectangular prism 54 can reflect the laser beam B formed by the imaging component 50 to the projection lens 24 to provide a multicolor laser beam to the laser projection apparatus 10'" for subsequent image projection. As for other related description for the laser projection apparatus 10'" (e.g., the design of adding at least one diffusion sheet), it could be reasoned by analogy according to the aforesaid embodiments and omitted herein.

To be noted, the number and configuration of lighting units (i.e., the multi-color or single-color laser configuration), the lens array configuration, and the number and configuration of prisms (i.e., the dual prism configuration or single-prism configuration) could be implemented interactively to enhance the design flexibility of the laser projection apparatus of the present invention in the optical component configuration. For example, in the embodiment adopting the single-color laser configuration, the present invention could further adopt the configuration of adding another lens array to improve the single-color light usage efficiency of the laser projection apparatus. As for other derived embodiments (e.g., the embodiment simultaneously adopting the single-prism configuration and the configuration of adding another lens array), the related description could be reasoned by analogy and omitted herein.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A laser projection apparatus comprising:

a laser set comprising a plurality of first lighting units arranged in sequence, the plurality of first lighting units emitting a first color light;

a condensing lens having a first lens portion and a second lens portion;

a reflecting unit obliquely disposed on a light-entrance axis of the first lens portion and opposite to the plurality of first lighting units for reflecting the first color light to be incident to the first lens portion along the light-entrance axis;

a reflecting diffuser disposed at a side of the condensing lens, for receiving the first color light transmitted from the first lens portion and reflecting the first color light to the second lens portion, to make the first color light travel along a light-exit axis of the second lens portion, a first center axis of the condensing lens being perpendicular to the light-entrance axis and the light-exit axis respectively, and a second center axis of the condensing lens being perpendicular to the first center axis;

a first lens array disposed on the light-exit axis, for receiving the first color light transmitted from the second lens portion, a length of the first lens array along the first center axis being less than or equal to one half of a diameter of the condensing lens, and a width of the first lens array along the second center axis being less than or equal to the diameter of the condensing lens;

an imaging module disposed on the light-exit axis, for receiving the first color light transmitted from the first lens array to form a projection beam; and a projection lens receiving the projection beam transmitted from the imaging module for optical projection.

2. The laser projection apparatus of claim 1 further comprising:

a second lens array connected to the first lens array and disposed on the light-entrance axis to be positioned between the first lens portion and the reflecting unit, for receiving the first color light;

wherein a micro-lens size of the second lens array is smaller than a micro-lens size of the first lens array.

3. The laser projection apparatus of claim 2, wherein a number of micro-lenses on the second lens array is greater than a number of micro-lenses on the first lens array.

4. The laser projection apparatus of claim 1 further comprising:

a diffusion sheet disposed on at least one of a position between the laser set and the reflecting unit, a position between the reflecting unit and the first lens portion, and a position between the second lens portion and the first lens array.

5. The laser projection apparatus of claim 4, wherein the diffusion sheet rotates or moves back and forth relative to the collimator lens.

6. The laser projection apparatus of claim 1, wherein the reflecting diffuser comprises a reflective sheet and a haze diffusion layer, and the haze diffusion layer is formed on the reflective sheet by machining or is attached or coated on the reflective sheet.

7. The laser projection apparatus of claim 1, wherein the reflecting diffuser is movably or rotatably disposed at the side of the condensing lens.

8. The laser projection apparatus of claim 1, wherein the reflecting unit comprises a reflective sheet, and the reflective sheet is obliquely disposed on the light-entrance axis to reflect the first color light to the first lens portion.

9. The laser projection apparatus of claim 8, wherein the laser set further comprises a plurality of second lighting units and a plurality of third lighting units arranged in sequence, the plurality of second lighting units and the plurality of third lighting units being adjacent to the plurality of first lighting units and emitting a second color light and a third color light respectively, the reflecting unit further comprises a dichroic sheet, the dichroic sheet is obliquely disposed on the light-entrance axis and opposite to the plurality of second lighting units and the plurality of third lighting units for reflecting the second color light and the third color light and making the first color light pass therethrough, and the first color light, the second color light and the third color light pass through the first lens portion along the light-entrance axis to be incident to the reflecting diffuser and then pass through the second lens portion and the first lens array sequentially via reflection of the reflecting diffuser.

10. The laser projection apparatus of claim 9, wherein the first color light is a red light, the second color light is a blue light, and the third color light is a green light.

11. The laser projection apparatus of claim 1, wherein the imaging module comprises:

at least one relay lens disposed on the light-exit axis to receive the first color light transmitted from the first lens array;

an imaging component disposed on the light-exit axis; and a rectangular prism disposed on the light-exit axis and located between the at least one relay lens and the imaging component, for transmitting the first color light from the at least one relay lens to the imaging component and reflecting the projection beam transmitted from the imaging component to the projection lens.

12. The laser projection apparatus of claim 11, wherein the imaging component is a digital micromirror device.

13. The laser projection apparatus of claim 1, wherein the imaging module comprises:

at least one relay lens disposed on the light-exit axis, for receiving the first color light transmitted from the first lens array;

a first rectangular prism disposed on the light-exit axis, for reflecting the first color light transmitted from the at least one relay lens;

an imaging component located at a side of the first rectangular prism, for receiving the first color light reflected by the first rectangular prism to form the projection beam; and a second rectangular prism disposed on the light-exit axis and opposite to the first rectangular prism, for making the projection beam transmitted from the imaging component to the projection lens.

14. The laser projection apparatus of claim 13, wherein the imaging component is a digital micromirror device.

15. The laser projection apparatus of claim 1, wherein the first center axis of the condensing lens intersects perpendicularly with the light-entrance axis and the light-exit axis, respectively.

16. The laser projection apparatus of claim 1, wherein the condensing lens is a collimator lens.

* * * * *